United States Patent [19]

Goto

[11] Patent Number: 5,610,384
[45] Date of Patent: Mar. 11, 1997

[54] MAGNETIC COUPLING CIRCUIT-DRIVING SYSTEM

[75] Inventor: Yuichi Goto, Hadano, Japan

[73] Assignee: Kabushiki Kaisha Toshiba, Kawasaki, Japan

[21] Appl. No.: 534,939

[22] Filed: Sep. 28, 1995

[30] Foreign Application Priority Data

Sep. 30, 1994 [JP] Japan .................... 6-236697

[51] Int. Cl.$^6$ .................... G06K 7/08; G06K 7/06
[52] U.S. Cl. .................... 235/435; 235/449; 235/439
[58] Field of Search .................... 235/439, 449, 235/487, 441, 492, 448, 435; 307/300, 307

[56] References Cited

U.S. PATENT DOCUMENTS

| | | | |
|---|---|---|---|
| 3,652,827 | 3/1928 | Inoue et al. | 235/439 |
| 3,752,960 | 6/1973 | Walton | 235/439 |
| 4,045,778 | 8/1977 | Atkins et al. | 235/435 |
| 4,146,781 | 3/1979 | Machate | 235/439 |
| 4,388,524 | 6/1983 | Walton | 235/439 X |
| 4,600,829 | 7/1986 | Walton | 235/439 |
| 4,791,285 | 12/1988 | Ohki | 235/449 |
| 4,864,292 | 9/1989 | Nieuwkoop | 235/439 X |
| 5,396,056 | 3/1995 | Yamaguchi | 235/439 |

FOREIGN PATENT DOCUMENTS

| | | | |
|---|---|---|---|
| 0008928 | 1/1979 | Japan | 235/435 |
| 0008927 | 1/1979 | Japan | 235/435 |
| 2079017 | 1/1982 | United Kingdom | 235/439 |
| 9005960 | 5/1990 | WIPO | 235/435 |
| 9305486 | 3/1993 | WIPO | 235/439 |

Primary Examiner—Donald T. Hajec
Assistant Examiner—Thien Minh Le
Attorney, Agent, or Firm—Cushman Darby & Cushman IP Group of Pillsbury Madison & Sutro LLP

[57] ABSTRACT

To create a critical coupling state of coils provided in the first and second series resonance circuits, the output resistances of circuits for driving the resonance circuits are adjusted, or the distance between the coils is adjusted. A sine wave AC signal of a frequency identical to the resonance frequency of the resonance circuits is applied to one of the resonance circuits in accordance with transmission data. When one of the coils has been excited, the other coil electromagnetically coupled with the excited coil is also excited, thereby generating magnetic fields of the same intensity and different phases. The coils which constitute a magnetic coupling circuit can be driven by a power lower than that required in the conventional case, thereby transmitting carrier waves of a necessary intensity.

12 Claims, 3 Drawing Sheets

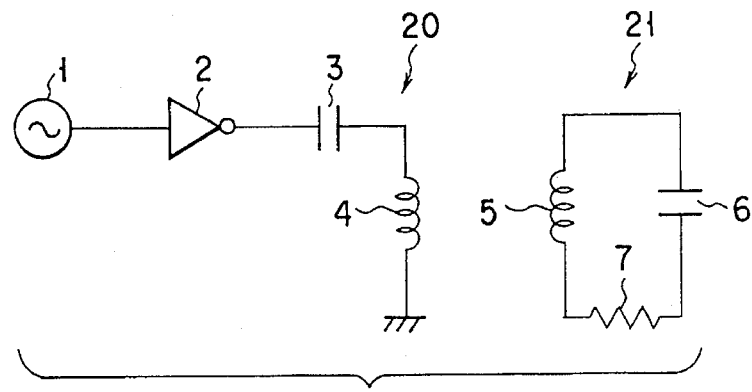
F I G. 1
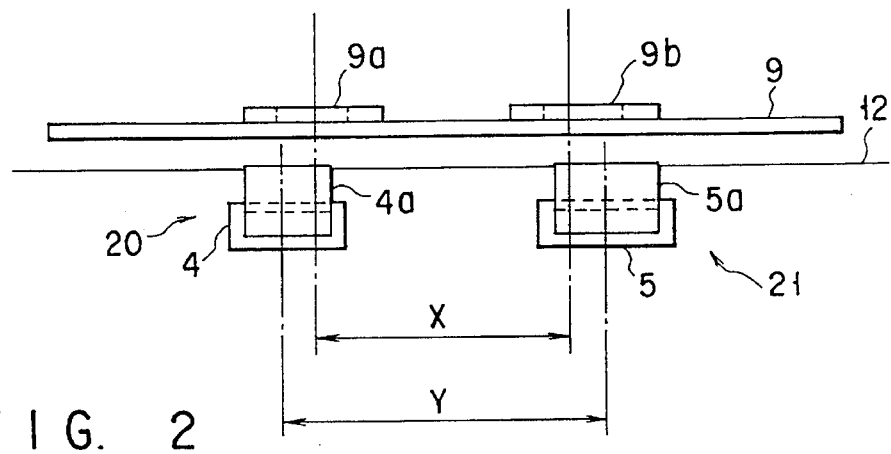
F I G. 2
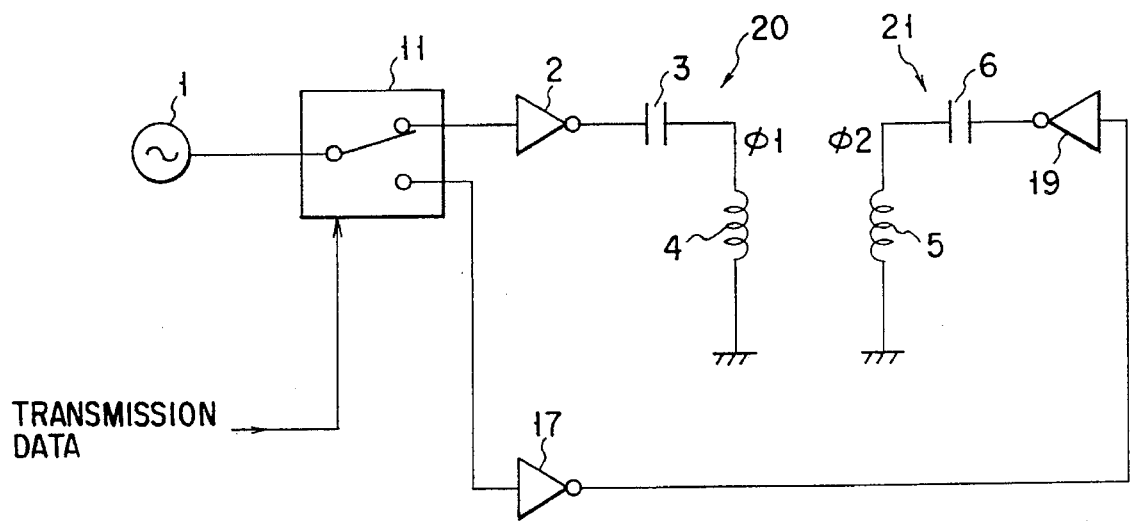
F I G. 3

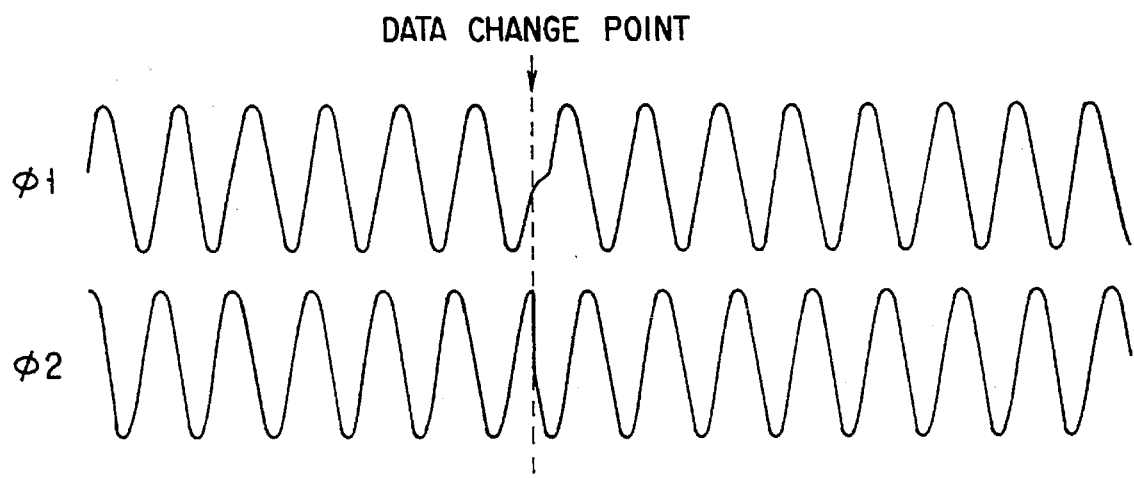
F I G. 4
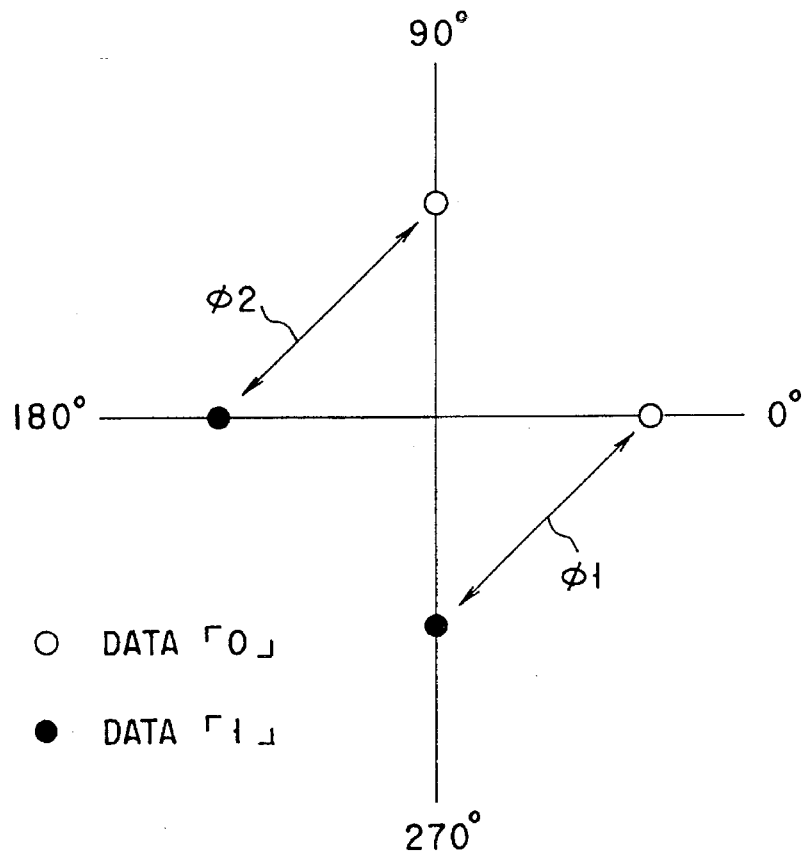
○ DATA 「0」
● DATA 「1」
F I G. 5

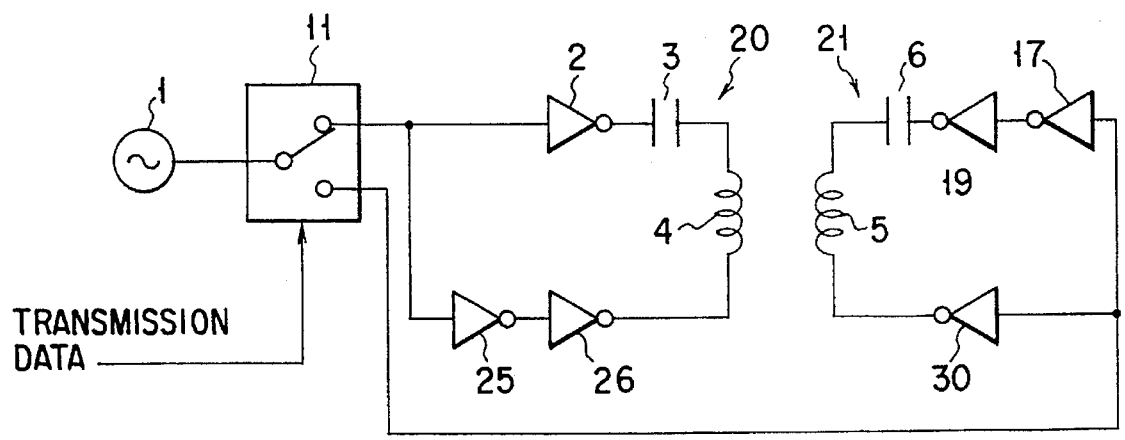
F I G. 6
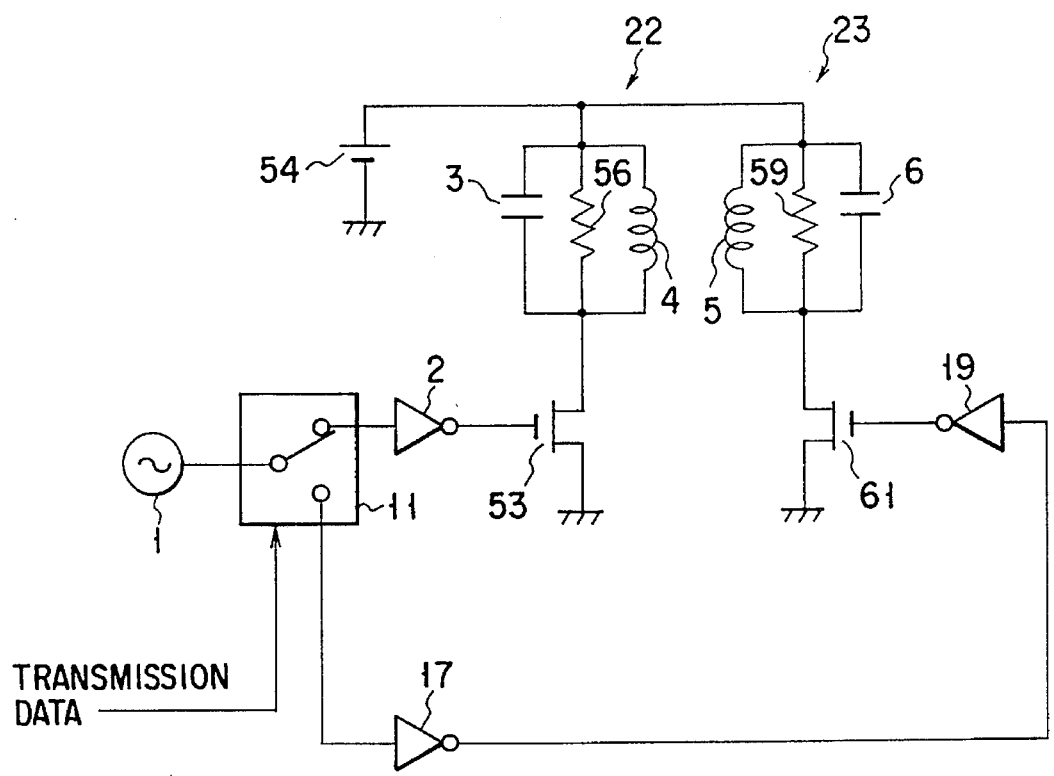
F I G. 7

MAGNETIC COUPLING CIRCUIT-DRIVING SYSTEM

BACKGROUND OF THE INVENTION

1. Field of the Invention

This invention relates to a card reader/writer for supplying data, etc. to a non-contact type data record medium, such as a non-contact type IC card, etc., in a non-contact manner by magnetic coupling, and more particularly to a magnetic coupling circuit-driving system for driving a magnetic coupling circuit incorporated in the card reader/writer.

2. Description of the Related Art

To enhance the reliability of an IC card as a data record medium, a non-contact type IC card and its card reader/writer (hereinafter referred to simply as "IC card" and "reader/writer", respectively) have recently been developed, which have no electric contacts therebetween and transmit power, data, etc. in a non-contact manner by magnetic coupling. When the IC card having two coupling coils and the reader/writer have been set, two coils constituting a magnetic coupling circuit in the reader/writer are magnetically coupled with the two coils of the IC card, thereby transmitting data in a non-contact manner through a magnetic field modulated on the basis of a PSK (Phase Shift Keying) modulation system.

In general, the two coils which constitute the magnetic coupling circuit of the reader/writer are simultaneously excited by two power signals which have a predetermined amplitude and a phase difference of 90° therebetween. Then, these two coils generate two magnetic fields with a phase difference of 90°, thereby generating a carrier wave to the IC card in a non-contact manner to supply thereto power, data, a clock signal, etc.

When the carrier wave is received by the IC card, it will be adversely influenced by the magnetically-coupled two coils of the IC card, since these coils are located close to each other in the IC card. In the conventional system, to prevent a turbulence in the magnetic field due to the influence and supply a signal of a predetermined voltage amplitude to the two coils of the IC card, the two coils of the reader/writer must be simultaneously driven by a power signal of a high voltage amplitude. Thus, the system requires high driving power, i.e. it costs high.

SUMMARY OF THE INVENTION

It is the object of the invention to provide a magnetic coupling circuit-driving system capable of driving two coils which constitute the magnetic coupling circuit of a reader/writer, using power much lower than in the conventional case, thereby generating an intense magnetic field sufficient to transmit a carrier wave.

A first resonance circuit having a first coil and a second resonance circuit having a second coil are provided in a reader/writer, and are adjusted such that they have the same resonance frequency. Further, there are provided an AC signal supply for generating an AC signal of the same frequency of the resonance frequency, and switching for supplying the AC signal to one of the first and second resonance circuits in accordance with input data. When one of the coils has been excited, a magnetic field is generated from the excited coil and excites the other coil. Thus, the first and second coils will not simultaneously be driven by the AC signal.

So as to create magnetic fields having the same intensity and a phase difference of 90°, the positions of the first and second coils are adjusted, or the circuit constants of the first and second resonance circuits are adjusted. AC signals having a phase difference of 180° are applied to one of the first and second resonance circuits via the switch. Two carrier waves having their phases shifted from each other in accordance with the transmission data are transmitted from the reader/writer to an IC card. The two coils which constitute the magnetic coupling circuit of the reader/writer generate magnetic fields intense enough to transmit data, etc. to the IC card, although it is driven by a power lower than that required in the conventional case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a circuit diagram, showing a basic structure of a magnetic coupling circuit-driving system according to a first embodiment of the invention;

FIG. 2 is a view, useful in explaining a method for adjusting the degree of coupling of a resonance circuit;

FIG. 3 is a circuit diagram, showing a structure of a magnetic coupling circuit-driving system according to a second embodiment of the invention;

FIG. 4 is a view, showing carrier waves generated from the FIG. 3 system;

FIG. 5 is a view, useful in explaining the principle of the PSK modulation;

FIG. 6 is a circuit diagram, showing a structure of a magnetic coupling circuit-driving system according to a third embodiment of the invention; and FIG. 7 is a circuit diagram, showing a structure of a magnetic coupling circuit-driving system according to a fourth embodiment of the invention.

DETAILED DESCRIPTION OF THE PREFERRED EMBODIMENTS

The embodiments of the invention will be explained with reference to the accompanying drawings. FIG. 1 shows a basic structure of a magnetic coupling circuit driving system according to a first embodiment of the invention.

As is shown in FIG. 1, the output terminal of a high frequency sine wave AC power supply 1 is connected to the input terminal of a driving circuit 2 consisting of an inverter circuit. The output terminal of the driving circuit 2 is connected to an end of a capacitor 3, and the other end of the capacitor 3 is connected to an end of a coil 4. The other end of the coil 4 is grounded. An end of the other coil 5 is connected to an end of a capacitor 6, and the other end of the capacitor 6 is connected to an end of a resistor 7. The other end of the resistor 7 is connected to the other end of the coil 5. Thus, the coil 5, the capacitor 6 and the resistor 7 constitute a series resonance circuit 21.

Each of the coils 4 and 5 is formed by winding a conductive wire on a magnetic core. The sine AC voltage applied from the sine wave AC power supply 1 to a resonance circuit 20 constituted by the coils 4 and 5 has a frequency equal to the resonance frequency of the resonance circuit. The capacity reactance of the capacitor 3 is adjusted such that the resonance frequency of the resonance circuit 21 including the coil 5 is equal to the resonance frequency of the resonance circuit 20 including the coil 4.

Further, when one of the coils 4 and 5 is excited, the other is also excited by induction, since the coils 4 and 5 are located close to each other. In FIG. 1, the coil 4 is first excited by the sine wave AC power supply 1.

As described above, the impedance of each element is adjusted such that the resonance circuit 20 including the coil 4 is equal to the resonance frequency of the resonance circuit 21 including the coil 5, and loss of energy due to induction between the coils 4 and 5 is equal to loss of energy in the resonance circuit 21 including the coil 5. When the elements are appropriately adjusted, the intensity of the magnetic field generated at the coil 4 is equal to that of the magnetic field generated at the coil 5, and the phase of the magnetic field at the coil 5 advances by 90° from that of the magnetic field at the coil 4.

The principle of the above will be explained with reference to FIG. 1. Suppose that the capacitance of the capacitor 3 is C3, the inductance of the coil 4 is L4, the inductance of the coil 5 is L5, the capacitance of the capacitor 6 is C6, the resistance of the resistor 7 is R7, and the mutual inductance between the coils 4 and 5 is M. In this case, the sensitivity Q of the resonance circuit 21 which depends on loss of energy is given by $$Q = \omega L5/R7 \quad (1)$$

Supposing that the coupling factor of the coils 4 and 5 is k, the conditions of critical coupling are given by $$Q \times k = 1 \quad (2)$$

$$k = M/(L4 \times L5)^{1/2} \quad (3)$$

The following equation is obtained by substituting equations (1) and (2) for equation (3):

$$(L4 \times L5)^{1/2}/M = \omega L5/R7 \quad (4)$$

If $L4 = L5 = L$, $$L/M = \omega L/R7 \quad (5)$$

Supposing that the impedance due to mutual inductance M is ZM, $$\omega M = ZM \quad (6)$$

The following equation is obtained by substituting equation (6) for equation (4):

$$\omega L/ZM = \omega L/R7 \quad (7)$$

$$\therefore ZM = R7 \quad (8)$$

Equation (8) indicates that the critical coupling is obtained when the impedance ZM based on the mutual inductance between the coils 4 and 5 is equal to the impedance R7 of the resonance circuit which determines the sensitivity Q of the resonance circuit 21 including the coil 5. The critical coupling indicates the state in which the magnetic fields generated at the coils 4 and 5 have the same intensity (i.e. the same voltage is generated between the opposite ends of each of the coils 4 and 5), and the phase of the magnetic field at the coil 5 advances by 90° from that of the magnetic field at the coil 4. The mutual inductance M between the two coils 4 and 5 is determined by their constants, their specifications, the distance therebetween, etc.

It is understood from equation (1) that the sensitivity Q of the resonance circuit 21 can be adjusted by connecting a resistor to the resonance circuit in series or parallel thereto. The voltage applied to the both opposite ends of the coil 5 is Q times (voltage magnification) the power supply voltage in the resonance state. If the value Q is too lowered by connecting a resistor of a high resistance to the resonance circuit in order to satisfy the conditions for critical coupling, the voltage magnification is reduced, thereby significantly reducing the efficiency. Countermeasures against it will be explained with reference to FIG. 2.

FIG. 2 is a view, useful in explaining a method for adjusting the degree of coupling of resonance circuits without reducing the voltage magnification. A reader/writer 12 employs the magnetic coupling circuit-driving system according to the invention, and an IC card 9 has two coupling coils 9a and 9b for transmitting and receiving data, etc. to and from the reader/writer 12. The reader/writer 12 has the coils 4 and 5 formed by winding conductive wires on the cores 4a and 5a, respectively, as shown in FIG. 1. FIG. 2 only shows the positional relationship between the coupling coils of the IC card 9 and the reader/writer 12.

When as is shown in FIG. 2, the IC card 9 has been aligned with the reader/writer 12 which employs the magnetic coupling circuit of the invention, the coupling coil 9a of the IC card 9 is magnetically coupled with the coil 4 of the reader/writer 12 in a non-contact manner. Similarly, the coupling coil 9b of the IC card 9 is magnetically coupled with the coil 5 of the reader/writer 12 in a non-contact manner.

The distance Y between center portions of the cores 4a and 5b of the coils 4 and 5 of the reader/writer 12 is set wider than the distance X between center portions of the connected coils 9a and 9b of the IC card 9. In this arrangement, the coupling degree k of the coils 4 and 5 of the reader/writer 12 is reduced (see equation (3)), thereby establishing critical coupling without reducing the sensitivity Q of the resonance circuit 21 including the coil 5.

On the other hand, where the coupling force between the coils 4 and 5 is not sufficiently strong, the coils 4 and 5 are positioned such that the distance Y between the center portions of the cores 4a and 5b is narrower than the distance X between the center portions of the coils 9a and 9b of the IC card 9, in a manner reverse to the FIG. 2 case. This arrangement of the coils 4 and 5 can adjust the coupling state of the resonance circuit 21 including the coil 5 without reducing the voltage magnification.

As explained above, in the embodiment, the capacitor 3 and the coil 4 form the series resonance circuit 20, while the coil 5, the capacitor 6 and the resistor 7 form the series resonance circuit 21. The resonance circuit 20 had the same resonance frequency as the resonance circuit 21. The sine wave AC power supply 1 supplies only the resonance circuit 20 with power of the same frequency as the resonance frequency. The impedance ZM due to the mutual inductance M between the coil 4 and the coil 5 magnetically coupled with the coil 4 is adjusted to be equal to the impedance R7 of the resistor 7 which determines the sensitivity Q of the resonance circuit 21. In addition, setting the distance Y between the cores 4a and 5b of the coils 4 and 5 wider than the distance X between the connected coils 9a and 9b of the IC card 9 equalizes the intensities of the magnetic fields generated at the coils 4 and 5 (i.e. equalizes the amplitudes of voltages applied to the coils). In this case, the phase of the magnetic field at the coil 5 advances by 90° from that of the magnetic field at the coil 4.

A second embodiment of the invention will now be explained. FIG. 3 shows a magnetic coupling circuit-driving system for driving the two coils by means of a switch 11 to transmit data, etc. using changes in the phases of the magnetic fields generated. This embodiment is a modification of the FIG. 1 basic structure. In FIG. 3, elements similar to those in FIG. 1 are denoted by corresponding reference numerals.

As is shown in FIG. 3, the switch 11 has one input terminal connected to the output of the sine wave AC power supply 1, and the other input terminal for receiving transmission data. Depending upon whether the transmission data is "1" or "0", the switch 11 switches to transmit a signal from the power supply 1 to the input terminal of the driving circuit 2 or to the input terminal of a logic inversion circuit 17. The logic inversion circuit 17 inverts the phase of a sine AC wave by 180°.

One end of the capacitor 3 is connected to the output terminal of the driving circuit 2, and the other end of the same is connected to one end of the coil 4. The output terminal of the logic inversion circuit 17 is connected to the input terminal of a driving circuit 19. The output terminal of the driving circuit 19 is connected to one end of a capacitor 6, and the other end of the capacitor 6 is connected to one end of the coil 5. The other end of the coil 5 is grounded.

In this structure, a sine AC wave is transmitted from the sine wave AC power supply 1 to the driving circuit 2 or the logic inversion circuit 17, depending upon whether transmission data is "1" or "0". In the case where the power supply 1 is connected to the driving circuit 2, the sine AC wave from the power supply 1 drives the coil 4 after its phase is inverted by the driving circuit 2. On the other hand, in the case where the power supply 1 is connected to the logic inversion circuit 17, the sine AC wave from the power supply 1 drives the coil 5 after its phase is twice inverted by the logic inversion circuit 17 and by the driving circuit 19.

Thus, the coils 4 and 5 are driven by sine AC waves having their phases shifted by 180° from each other. When one of the coils 4 and 5 has been excited, the other coil is excited by induction. As a result, magnetic fields having the same intensity and phases shifted by 90° from each other are created on the basis of the principle explained with reference to FIG. 1.

Whether the phase of the magnetic field at the coil 4 or that of the magnetic field at the coil 5 advances depends upon the transmission data ("1" or "0"). FIG. 4 shows carrier wave voltages φ1 and φ2 applied to the coils 4 and 5 in accordance with the transmission data. When the transmission data is "0", the phase of the carrier voltage φ1 retards by 90° from that of the carrier voltage φ2. When, on the other hand, the transmission data is "1", the phase of the carrier voltage φ1 advances by 90° from that of the carrier voltage φ2. Such modulation is called "PSK" modulation.

Referring then to FIG. 5, the carrier waves transmitted from the coils 4 and 5 will be explained. FIG. 5 shows phase shifts of the carrier waves PSK-modulated in accordance with the transmission data. The carrier wave φ1 is transmitted, for example, from the coil 4 of the reader/writer 12, while the carrier wave φ2 is transmitted, for example, from the coil 5.

When the data has been shifted from "0" to "1", the carrier wave φ1 has its phase retarded by 90° from 0° to 270°, and the carrier wave φ2 has its phase advanced by 90° from 90° to 180°. Further, when the data has been shifted from "1" to "0", the carrier wave φ1 has its phase advanced by 90° from 270° to 0°, and the carrier wave φ2 has its phase retarded by 90° from 180° to 90°. Thus, the phases of the carrier waves φ1 and φ2 change invertedly in accordance with the transmission data.

As described above, the carrier waves φ1 and φ2, which have their phases shifted by 90° from each other and changed in accordance with the transmission data, are transmitted from the coils 4 and 5 magnetically coupled with each other. It is a matter of course that the coils 4 and 5 can be constructed so that they transmit the carrier waves φ2 and φ1, respectively.

Referring back to FIG. 3, output resistances included in the driving circuits 2 and 19 have the same function as the resistor 7 which is employed in the FIG. 1 case for adjusting the sensitivity Q of the resonance circuit 21. Unless in this case, matching conditions of the impedance due to the mutual inductance M between the coils 4 and 5, and each of the output resistances are not satisfied, the coils 4 and 5 cannot form magnetic fields of the same intensity. In other words, no critical coupling state can be created. If, in order to create the critical coupling state, the intensities of the magnetic fields are made equal to each other by adjusting the output resistances of the driving circuits 2 and 19, the voltage magnification is reduced and accordingly the substantial efficiency of the resonance circuit is reduced. To avoid this, it is desirable to modify the constants or the shapes of the coils 4 and 5 so as to make the impedance equal to the sum of the output resistances. However, if modification of the constants and the shapes of the coils does not provide an optimal coupling state, it is necessary to arrange the coils 4 and 5 as explained with reference to FIG. 2.

As explained above, in the second embodiment, the output of the sine wave AC power supply 1, which has a frequency equal to the resonance frequency of each of the resonance circuits 20 and 21, is applied to one of the resonance circuits 20 and 21 via the switch 11, depending upon whether the transmission data is "1" or "0". By virtue of the logic inversion circuit 17, the sine AC wave applied to the resonance circuit 21 including the coil 5 is shifted by 180° from the phase of the sine AC wave applied to the resonance circuit 20 including the coil 4. When one of the coils 4 and 5 has been excited, the other coil is also excited by electromagnetic coupling, with the result that magnetic fields having the same intensity and phases shifted from each other by 90° are generated in accordance with the transmission data, thereby transmitting the carrier waves φ1 and φ2.

A third embodiment of the invention will be explained with reference to FIG. 6. FIG. 6 shows a magnetic coupling circuit-driving system for driving each of both ends of two series resonance circuits to transmit data, etc. The third embodiment is another modification of the FIG. 1 basic structure. In FIG. 6, elements similar to those in FIG. 3 are denoted by corresponding reference numerals, and explanations will be given only of different elements.

As is shown in FIG. 6, the sine wave AC power supply 1 is connected to one input terminal of the switch 11. The other input terminal of the switch 11 receives the transmission data. Depending upon whether the transmission data is "1" or "0", the switch 11 connects the sine wave AC power supply 1 to the driving circuit 2 and a logic inversion circuit 25, or to the logic inversion circuit 17 and a driving circuit 30.

The logic inversion circuit 17 inverts by 180° the phase of the sine AC wave output from the sine AC power supply 1, thereby outputting the phase-inverted sine AC wave from its output terminal. The output terminal of the driving circuit 2 is connected to one end of the capacitor 3, and the other end of the capacitor 3 is connected to one end of the coil 4. The other end of the coil 4 is grounded. One end of the coil 5 is connected to one end of the capacitor 6, and the other end of the capacitor 6 is connected to the output terminal of the driving circuit 19 constituted by an inverter circuit. The output terminal of the logic inversion circuit 17 is connected to the input terminal of the driving circuit 19.

Thus, the driving circuit 2 and a driving circuit 26 are connected to the both opposite ends of the series resonance circuit 20 constituted by the coil 4 and the capacitor 3. The output sine waves of the driving circuits 2 and 26 have phases shifted from each other by 180° by means of the inversion circuit 25. This structure enables each of the amplitudes of the voltages output from the driving circuits 2 and 26 to be made half of the amplitude of the voltage output from the driving circuit 2 employed in the FIG. 3 structure, thus enabling a low voltage operation.

Similarly, the driving circuits 19 and 30 are connected to the both opposite ends of the series resonance circuit 21 constituted by the coil 5 and the capacitor 6. The output sine waves of the driving circuits 19 and 30 have phases shifted from each other by 180° by means of the inversion circuit 17. This structure enables each of the amplitudes of the voltages output from the driving circuits 19 and 30 to be made half of the amplitude of the voltage output from the driving circuit 19 employed in the FIG. 3 structure, thus enabling a low voltage operation.

A fourth embodiment of the invention will be explained with reference to FIG. 7. FIG. 7 shows a magnetic coupling circuit-driving system for driving two parallel resonance circuits to transmit data, etc. The fourth embodiment is a further modification of the FIG. 1 basic structure. In FIG. 7, elements similar to those in FIG. 3 are denoted by corresponding reference numerals, and explanations will be given only of different elements.

As is shown in FIG. 7, the sine wave AC power supply 1 is connected to the switch 11. Depending upon whether the transmission data is "1" or "0", the switch 11 connects the sine wave AC power supply 1 to the driving circuit 2 or to the logic inversion circuit 17.

The output terminal of the driving circuit 2 is connected to the gate of a transistor 53, and the source of the transistor 53 is grounded. The drain terminal of the transistor 53 is connected to one end of each of the capacitor 3, a resistor 56 and the coil 4. The other end of each of the capacitor 3, the resistor 56 and the coil 4 is connected to the anode terminal of a DC power supply 54. Thus, when the transistor 53 has been turned on by a sine AC wave output from the driving circuit 2, a parallel resonance circuit 22 constituted by the capacitor 3, the resistor 56 and the coil 4 is driven. The resistor 56 serves as a dumping resistor for reducing the sensitivity Q of the parallel resonance circuit 22 including the coil 4.

The output terminal of the logic inversion circuit 17 is connected to the input terminal of the driving circuit 19, and the output terminal of the driving circuit 19 is connected to the gate of a transistor 61. The source of the transistor 61 is grounded, and the drain thereof is connected to one end of each of the capacitor 6, a resistor 59 and the coil 5. The other end of each of the capacitor 6, the resistor 59 and the coil 5 is connected to the anode terminal of a DC power supply 54. Thus, when the transistor 61 has been turned on by a sine AC wave output from the driving circuit 19, a parallel resonance circuit 23 constituted by the capacitor 6, the resistor 59 and the coil 5 is driven. The resistor 59 serves as a dumping resistor for reducing the sensitivity Q of the parallel resonance circuit 23 including the coil 5.

In the fourth embodiment, too, the resonance frequency of the resonance circuit 22 including the coil 4 and that of the resonance circuit 23 including the coil 5 are adjusted to be equal to each other. The output of the sine was AC power supply 1, which has the same frequency of the resonance frequency, is applied to one of the resonance circuits 22 and 23 via the switch 11, depending upon whether the transmission data is "1" or "0". By virtue of the logic inversion circuit 17, the phase of the sine AC wave applied to the resonance circuit 23 including the coil 5 is shifted by 180° from the phase of the sine AC wave applied to the resonance circuit 22 including the coil 4. When one of the coils 4 and 5 has been excited, the other coil is also excited by electromagnetic coupling, with the result that magnetic fields having the same intensity and phases shifted from each other by 90° are generated at the coils 4 and 5. The coil to be driven is shifted from one to the other in accordance with the transmission data, thereby transmitting the carrier wave φ1 or φ2 corresponding to the transmission data. Therefore, it is not necessary, unlike the conventional case, to employ two electronic circuits for generating magnetic fields with a phase difference of 90° at the two coils, respectively, which means that the circuit can have a simple structure.

As described above, the fourth embodiment, which has the parallel resonance circuit 22 constituted by the coil 4, the capacitor 3 and the resistor 56 and the parallel resonance circuit 23 constituted by the coil 5, the capacitor 6 and the resistor 59, can provide a magnetic coupling circuit of a high output impedance. Furthermore, when the transistors 53 and 61 have been turned on by sine AC waves having a phase difference of 180° and output from the driving circuit 2 and 19, the coils 4 and 5 are driven, respectively.

In the fourth embodiment, the dumping resistors 4 and 59 can be adjusted so that the coils 4 and 5 can be coupled by critical magnetic coupling. Alternatively, the critical coupling can be realized by setting the distance Y between the cores 4a and 5b of the coils 4 and 5 wider than the distance X between the connected coils 9a and 9b of the IC card 9, as in the first embodiment.

In summary, the present invention can provide a magnetic coupling circuit-driving system capable of driving, with a lower power, two coils constituting a magnetic coupling circuit to generate intense magnetic fields for transmitting carrier waves of a predetermined amplitude.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic coupling circuit-driving system comprising:

a magnetic coupling circuit including a first resonance circuit having a first coil, and a second resonance circuit having a second coil and a resonance frequency identical to that of the first resonance circuit;

first and second driving circuits for driving the first and second resonance circuits, respectively; and switching means for supplying an AC signal of a frequency identical to the resonance frequency, to one of the first and second resonance circuits in accordance with input data;

wherein the first and second coils generate magnetic fields having the same intensity each other and different phases.

2. The system according to claim 1, wherein the second driving circuit has means for inverting the AC signal from the switching means, and the inverted AC signal drives the second resonance circuit.

3. The system according to claim 2, wherein the first and second resonance circuits are series resonance circuits each including a capacitor and both opposite terminals, and said first and second driving circuits have means for applying a signal voltage between the both opposite terminals of the first resonance circuit, and applying another signal voltage with a phase opposite to that of the first-mentioned signal voltage, between the both opposite terminals of the second resonance circuit.

4. The system according to claim 2, wherein each of the first and second resonance circuits is a parallel resonance circuit including a capacitor.

5. The system according to claim 1, wherein the positions of the first and second coils are adjusted such that magnetic fields having phases shifted by 90° from each other are generated at the first and second coils.

6. The system according to claim 1, wherein the first and second driving circuits have output resistances, respectively, and the output resistances are adjusted such that magnetic fields having phases shifted by 90° from each other are generated at the first and second coils.

7. The system according to claim 1, further comprising a non-contact type data record medium, having third and fourth coils magnetically coupled with each other, for receiving carrier waves transmitted from magnetic fields generated at the first and second coils, each of the third and fourth coils having an axis, and each of the first and second coils having an axis, the distance between the axes of the first and second coils being set wider than the distance between the axes of the third and fourth coils so that magnetic field having the same intensity and phases shifted from each other are generated at the first and second coils of the resonance circuits.

8. A method for driving a magnetic coupling circuit formed by magnetically coupling a first coil which constitutes a first resonance circuit, with a second coil which constitutes a second resonance circuit, to thereby generate magnetic fields of a predetermined intensity at the coils and transmit carrier waves having phases varied in accordance with transmission data, comprising the steps of:

adjusting the first and second resonance circuits such that magnetic fields generated at the coils have the same intensity and different phases; and exciting one of the first and second coils in accordance with the transmission data to excite the other coil by mutual induction between them.

9. The method according to claim 8, further comprising:

adjusting the first and second resonance circuits such that they have the same resonance frequency;

exciting, by means of a signal having a frequency identical to the resonance frequency, one of the first and second coils which constitute the first and second resonance circuits, in accordance with the transmission data, thereby exciting the other coil by mutual induction between them and transmitting carrier waves having phases varied in accordance with transmission data.

10. The method according to claim 9, wherein the exciting step includes the step of supplying one of the first and second resonance circuit with one of a first signal having a predetermined amplitude and a frequency identical to the resonance frequency, and a second power signal having a phase shifted by 180° from the phase of the first power signal, in accordance with the transmission data, thereby exciting one of the first and second coils and exciting the other coil by mutual induction between them.

11. The method according to claim 8, wherein the adjusting step includes the step of adjusting the positions of the first and second coils such that the first and second resonance circuits reach a predetermined coupling state in which they generate magnetic fields with a phase difference of 90°.

12. The method according to claim 8, wherein the exciting step includes the step of supplying the non-contact type data record medium with carrier waves having their phases varied in accordance with the transmission data;

and the adjusting step includes the step of setting the distance between axes of the first and second coils wider than the distance between axes of magnetically coupled third and fourth coils employed in the non-contact type data record medium, such that the first and second resonance circuits reach a predetermined coupling state in which they can generate magnetic fields with a predetermined intensity and different phases.

* * * * *